US012710126B2

(12) United States Patent
Ozkan et al.

(10) Patent No.: US 12,710,126 B2
(45) Date of Patent: Aug. 18, 2026

(54) MOUNT ASSEMBLY FOR A DISPLAY

(71) Applicant: TRANSFORM PARTNERS LLC, Poway, CA (US)

(72) Inventors: Mehmet Firat Ozkan, San Diego, CA (US); Ozgur Gorur, San Diego, CA (US); Kanat Ilter, San Diego, CA (US)

(73) Assignee: Transform Partners LLC, Poway, CA (US)

( * ) Notice: Subject to any disclaimer, the term of this patent is extended or adjusted under 35 U.S.C. 154(b) by 81 days.

(21) Appl. No.: 18/395,219

(22) Filed: Dec. 22, 2023

(65) Prior Publication Data

US 2025/0207717 A1 Jun. 26, 2025

(51) Int. Cl.
*F16M 11/04* (2006.01)
*F16M 13/02* (2006.01)

(52) U.S. Cl.
CPC ......... *F16M 11/046* (2013.01); *F16M 11/048* (2013.01); *F16M 13/02* (2013.01); *F16M 2200/024* (2013.01)

(58) Field of Classification Search
CPC .. F16M 11/12; F16M 11/046; F16M 11/2092; F16M 2200/063; A47B 2097/005
USPC .................................... 248/280.11, 919, 920
See application file for complete search history.

(56) References Cited

U.S. PATENT DOCUMENTS 5,826,846 A * 10/1998 Buccieri ............ F16M 11/2014 248/278.1
6,012,693 A * 1/2000 Voeller ................ F16M 11/048 248/920
7,823,847 B2 * 11/2010 Bremmon .............. F16M 13/02 248/920
8,777,172 B2 * 7/2014 Sapper .................. F16M 11/24 248/921
8,864,092 B2 * 10/2014 Newville ............... F16M 13/02 361/679.01
9,772,065 B2 * 9/2017 Stifal .................. A47B 97/001
11,607,042 B1 * 3/2023 Massey .................. F16M 11/10
11,920,726 B2 * 3/2024 You .................... F16M 11/2014
12,022,948 B1 * 7/2024 Irving .................... A47B 97/00
12,163,621 B2 * 12/2024 Xu ......................... F16M 13/02
12,372,195 B2 * 7/2025 Massey .................. F16M 11/24
2007/0102596 A1 * 5/2007 Sung .................. F16M 11/2092 248/122.1

(Continued)

*Primary Examiner* — Bradley Duckworth
(74) *Attorney, Agent, or Firm* — Knobbe, Martens, Olson & Bear, LLP

(57) ABSTRACT

A display mount for mounting a display over a mantle, fireplace, or similar structure can include a wall mounting portion configured to be secured to a wall, a height adjustment assembly pivotally coupled to the wall mounting portion, and a display mounting portion coupled to the front bracket and further configured to couple to a rear of a display. The height adjustment assembly can include a rear bracket coupled to the wall mounting portion, a front bracket, an upper fixed arm pivotally coupled on a first end to the rear bracket and pivotally coupled on a second end to the front bracket, a lower fixed arm pivotally coupled on a first end to the rear bracket and pivotally coupled on a second end to the front bracket, and an adjustable tension arm pivotally coupled on a first end to the rear bracket and pivotally coupled on a second end to the front bracket, the adjustable tension arm comprising an adjustable length and providing an adjustable tension force.

18 Claims, 14 Drawing Sheets

(56) References Cited

U.S. PATENT DOCUMENTS

2022/0397229 A1* 12/2022 Massey .................. F16M 11/10
2024/0183485 A1* 6/2024 You .................... F16M 11/2021
2024/0209979 A1* 6/2024 Newville ........... F16M 11/2014
2025/0040705 A1* 2/2025 Newville ............. A47B 97/001
2025/0172232 A1* 5/2025 Xu ......................... F16M 11/10

* cited by examiner 100
100
102
104
104
112
114
148
150
152
154
156
158
158
160
162
164
166
168
170
172
172
172

MOUNT ASSEMBLY FOR A DISPLAY

BACKGROUND

Field

The application relates to a mount assembly for a display such as a television. In particular, this application relates to a mount assembly configured to mount a display over a mantle or fireplace that allows the display to be lowered in front of the fireplace or mantle.

Description

Displays, such as televisions, computer monitors, and the like, are available in a wide variety of technologies, including LED (light emitting diode), LCD (liquid crystal display), OLED (organic LED), QLED (quantum dot LED), plasma, and others. Displays are available in a variety of sizes suitable for various applications, from home to commercial use. In some instances, it is desirable to mount a display to a wall or other surface at a position over a mantle, fireplace, or other similar structure.

SUMMARY

This application describes display mounts for mounting a display. In particular, the display mounts described herein can be configured to allow for height adjustments for the display, and can be particularly advantageous when used on displays that are to be installed over a mantle or fireplace because they allow the display to be moved down and/or in front of the mantle or fireplace to provide more comfortable viewing and to be rotated up and out of the way for aesthetic storage.

In a first aspect, a display mount for mounting a display over a mantle, fireplace, or similar structure can include a wall mounting portion configured to be secured to a wall, a height adjustment assembly pivotally coupled to the wall mounting portion, and a display mounting portion coupled to the front bracket and further configured to couple to a rear of a display. The height adjustment assembly can include a rear bracket coupled to the wall mounting portion, a front bracket, an upper fixed arm pivotally coupled on a first end to the rear bracket and pivotally coupled on a second end to the front bracket, a lower fixed arm pivotally coupled on a first end to the rear bracket and pivotally coupled on a second end to the front bracket, and an adjustable tension arm pivotally coupled on a first end to the rear bracket and pivotally coupled on a second end to the front bracket, the adjustable tension arm comprising an adjustable length and providing an adjustable tension force.

In some embodiments, the adjustable tension arm comprises a first arm portion, a second arm portion, the second arm portion slidingly engaged with the first arm portion such that the adjustable length of the adjustable tension arm is adjusted by varying a position of the second arm portion relative to the first arm portion. In some embodiments, the second arm portion is telescopingly engaged with the first arm portion.

In some embodiments, the adjustable tension arm further comprises one or more springs positioned on or within the adjustable tension arm, the one or more springs providing the adjustable tension force, and an adjustment mechanism for adjusting the adjustable tension force by varying the length of the one or more springs. In some embodiments, the one or more springs are provided within an interior space formed in the first arm portion and the second arm portion. In some embodiments, the one or more springs are attached on a first end to an end of the adjustable tension arm, and wherein the one or more springs are attached on a second end to the adjustment mechanism.

In some embodiments, the adjustment mechanism comprises a carriage, and wherein the one or more springs are attached on the second end to the carriage, a shaft, wherein the carriage is mounted on the shaft, and an adjustment head, wherein rotation of the adjustment head causes the carriage to travel along the shaft to adjust the adjustable tension force. In some embodiments, the carriage further comprises pins engaged with slots formed on the second arm portion. In some embodiments, the one or more springs comprise two springs positioned in parallel.

In some embodiments, the display mounting portion comprises an adjustable hanging rod assembly coupled to the front bracket; the adjustable hanging rod assembly comprising an upper rod and a lower rod, and a hanging hook assembly comprising at least a pair of upper hooks and a pair of lower hooks configured to engage with the upper rod and the lower rod, the hanging hook assembly configured to couple to the rear portion of the display. In some embodiments, the hanging hook assembly further comprises a right hook bracket configured to couple to the rear portion of the display, the right hook bracket comprising a first upper hook of the pair of upper hooks and a first lower hook of the pair lower hooks, and a left hook bracket configured to couple to the rear portion of the display, the left hook bracket comprising a second upper hook of the pair of upper hooks and a second lower hook of the pair lower hooks. In some embodiments, a plurality of locking brackets is configured to secure the upper and lower hooks around the upper and lower rods. In some embodiments, each of the plurality of locking brackets is configured to be secured to one of the right hook bracket or the left hook bracket with a fastener.

In some embodiments, the hanging hook assembly further comprises a right extension bracket configured to couple to the right hanging hook bracket at a variety of positions, a left extension bracket configured to couple to the right hanging hook bracket at a variety of positions, and a cross-bracket extending between and coupling the right and left extension brackets. In some embodiments, the position of the cross-bracket relative to the display can be adjusted by adjusting the positions of the right and left extension brackets. In some embodiments, the cross-bracket comprises a soundbar support bracket. In some embodiments, a handle is coupled to the cross-bracket, wherein a height of the handle relative to the cross-bracket is adjustable.

In some embodiments, wherein the hanging rod assembly is configured to couple to the front bracket to provide at 30 degrees of pivot about a vertical axis in each direction. In some embodiments, wherein the hanging rod assembly is configured to couple to the front bracket to provide at 10 degrees of pivot about a horizontal axis in each direction. In some embodiments, wherein the hanging rod assembly is configured to couple to the front bracket to provide at 5 degrees of rotation in a plane of the display.

In another aspect, a display mount for mounting a display over a mantle, fireplace, or similar structure can include a wall mounting portion configured to be secured to a wall, a height adjustment assembly pivotally coupled to the wall mounting portion, and a display mounting portion coupled to the front bracket and further configured to couple to a rear of a display. The height adjustment assembly can include a rear bracket coupled to the wall mounting portion, a front bracket, an upper fixed arm pivotally coupled on a first end to the rear bracket and pivotally coupled on a second end to the front bracket, a lower fixed arm pivotally coupled on a first end to the rear bracket and pivotally coupled on a second end to the front bracket, an adjustable tension arm pivotally coupled on a first end to the rear bracket and pivotally coupled on a second end to the front bracket, the adjustable tension arm comprising an adjustable length and providing an adjustable tension force, and two gas struts extending between the rear bracket and the upper fixed arm.

In some embodiments, the adjustable tension arm comprises a first arm portion, a second arm portion, the second arm portion slidingly engaged with the first arm portion such that the adjustable length of the adjustable tension arm is adjusted by varying a position of the second arm portion relative to the first arm portion. In some embodiments, the second arm portion is telescopingly engaged with the first arm portion.

In some embodiments, the adjustable tension arm further comprises one or more springs positioned on or within the adjustable tension arm, the one or more springs providing the adjustable tension force, and an adjustment mechanism for adjusting the adjustable tension force by varying the length of the one or more springs. In some embodiments, the one or more springs are provided within an interior space formed in the first arm portion and the second arm portion. In some embodiments, the one or more springs are attached on a first end to an end of the adjustable tension arm, and wherein the one or more springs are attached on a second end to the adjustment mechanism.

In some embodiments, the adjustment mechanism comprises a carriage, and wherein the one or more springs are attached on the second end to the carriage, a shaft, wherein the carriage is mounted on the shaft, and an adjustment head, wherein rotation of the adjustment head causes the carriage to travel along the shaft to adjust the adjustable tension force. In some embodiments, the carriage further comprises pins engaged with slots formed on the second arm portion. In some embodiments, the one or more springs comprise two springs positioned in parallel.

In some embodiments, the display mounting portion comprises an adjustable hanging rod assembly coupled to the front bracket; the adjustable hanging rod assembly comprising an upper rod and a lower rod, and a hanging hook assembly comprising at least a pair of upper hooks and a pair of lower hooks configured to engage with the upper rod and the lower rod, the hanging hook assembly configured to couple to the rear portion of the display. In some embodiments, the hanging hook assembly further comprises a right hook bracket configured to couple to the rear portion of the display, the right hook bracket comprising a first upper hook of the pair of upper hooks and a first lower hook of the pair lower hooks, and a left hook bracket configured to couple to the rear portion of the display, the left hook bracket comprising a second upper hook of the pair of upper hooks and a second lower hook of the pair lower hooks. In some embodiments, a plurality of locking brackets is configured to secure the upper and lower hooks around the upper and lower rods. In some embodiments, each of the plurality of locking brackets is configured to be secured to one of the right hook bracket or the left hook bracket with a fastener.

In some embodiments, the hanging hook assembly further comprises a right extension bracket configured to couple to the right hanging hook bracket at a variety of positions, a left extension bracket configured to couple to the right hanging hook bracket at a variety of positions, and a cross-bracket extending between and coupling the right and left extension brackets. In some embodiments, the position of the cross-bracket relative to the display can be adjusted by adjusting the positions of the right and left extension brackets. In some embodiments, the cross-bracket comprises a soundbar support bracket. In some embodiments, a handle is coupled to the cross-bracket, wherein a height of the handle relative to the cross-bracket is adjustable.

In some embodiments, wherein the hanging rod assembly is configured to couple to the front bracket to provide at 30 degrees of pivot about a vertical axis in each direction. In some embodiments, wherein the hanging rod assembly is configured to couple to the front bracket to provide at 10 degrees of pivot about a horizontal axis in each direction. In some embodiments, wherein the hanging rod assembly is configured to couple to the front bracket to provide at 5 degrees of rotation in a plane of the display.

BRIEF DESCRIPTION OF THE DRAWINGS

The features and advantages of the systems, devices, and methods described herein will become apparent from the following description, taken in conjunction with the accompanying drawings. These drawings depict embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION

This application describes display mounts for mounting a display. In particular, the display mounts described herein can be configured to allow for height adjustments for the display, and can be particularly advantageous when used on displays that are to be installed over a mantle or fireplace because they allow the display to be moved down and/or in front of the mantle or fireplace to provide more comfortable viewing and to be rotated up and out of the way for aesthetic storage.

Figure 1:
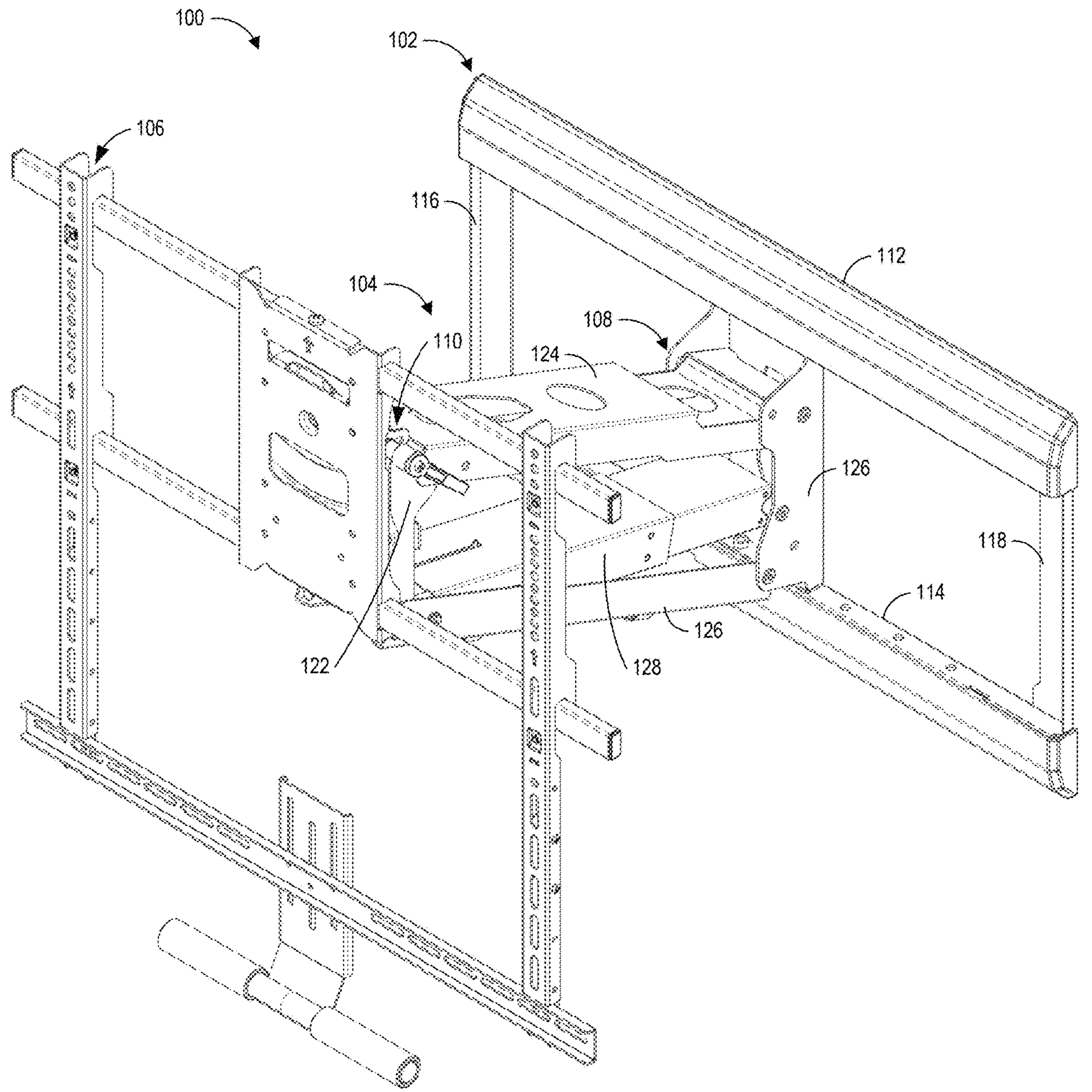
FIG. 1 is an isometric view of an embodiment of a display mount for mounting a display.

FIG. 1 is an isometric view of an embodiment of a display mount 100 for mounting a display. In some instances, the display mount 100 is configured to mount a display, such as a television in a manner such that the height of the display can be adjusted. In more particular examples, the display mount 100 can be configured to mount a display over a mantle, fireplace, or other similar structure at a position that is above the mantle and which allows the display to be lowered to another position in front of and/or below the mantle. This can be particularly advantageous as it is likely most aesthetically pleasing to mount the display above the mantle, but when using or viewing the display it may be desirable to lower the display in front of and/or below the mantle in order to provide a more comfortable viewing experience. Further, the display mount can be configured such that the display can be easily moved to any of a range of heights and can remain at that height in a free-floating manner. According to embodiments of the display mount described herein, this can be accomplished in a quick and easy manner, for example, by a single person and/or without requiring the use of tools.

In the embodiment illustrated in FIG. 1, the display mount 100 includes a wall mounting portion 102, a height adjustment assembly 104, and a display mounting portion 104. The wall mounting portion 102 can be configured to be secured to a wall, for example, at a location above a mantle, fireplace, or other similar structure. The height adjustment assembly 104 is couplable or coupled to the wall mounting portion 102 on a first end 108. The height adjustment assembly 104 is pivotally coupled to the wall mounting portion 102 at the first end such that the height adjustment assembly 104 can pivot up or down relative to wall mounting portion 102 in order to adjust a height of a display coupled to the display mount 100. This adjustment will be described in more detail below with reference to FIGS. 2-4. A second end of the height adjustment assembly is coupled to the display mounting portion 104. The display mounting portion 104 can be configured to couple to the display.

Thew wall mounting portion 104 can comprise an upper cross member 112, a lower cross member 114, a left vertical support 116, and a right vertical support 118, although other configurations for the wall mounting portion 104 are possible. In the illustrated embodiment of FIG. 1, the upper and lower cross members 112, 114 are provided with decorative covers to provide a more clean and appealing appearance. The upper and lower cross members 112, 114 are shown without the decorative covers in, for example, FIGS. 5A, 6, and 7. As shown with reference to FIG. 6, for example, the upper and lower cross members 112, 114 can comprise plates or brackets provided with holes and or slots through which fasteners (e.g., screws or others) can be used to secure the upper and lower cross members 112, 114 to a wall. The left and right vertical supports 116, 118 can be provided to provide structural support and rigidity to the wall mounting portion 104. In some embodiments, these may also be secured to the wall.

Figure 2:
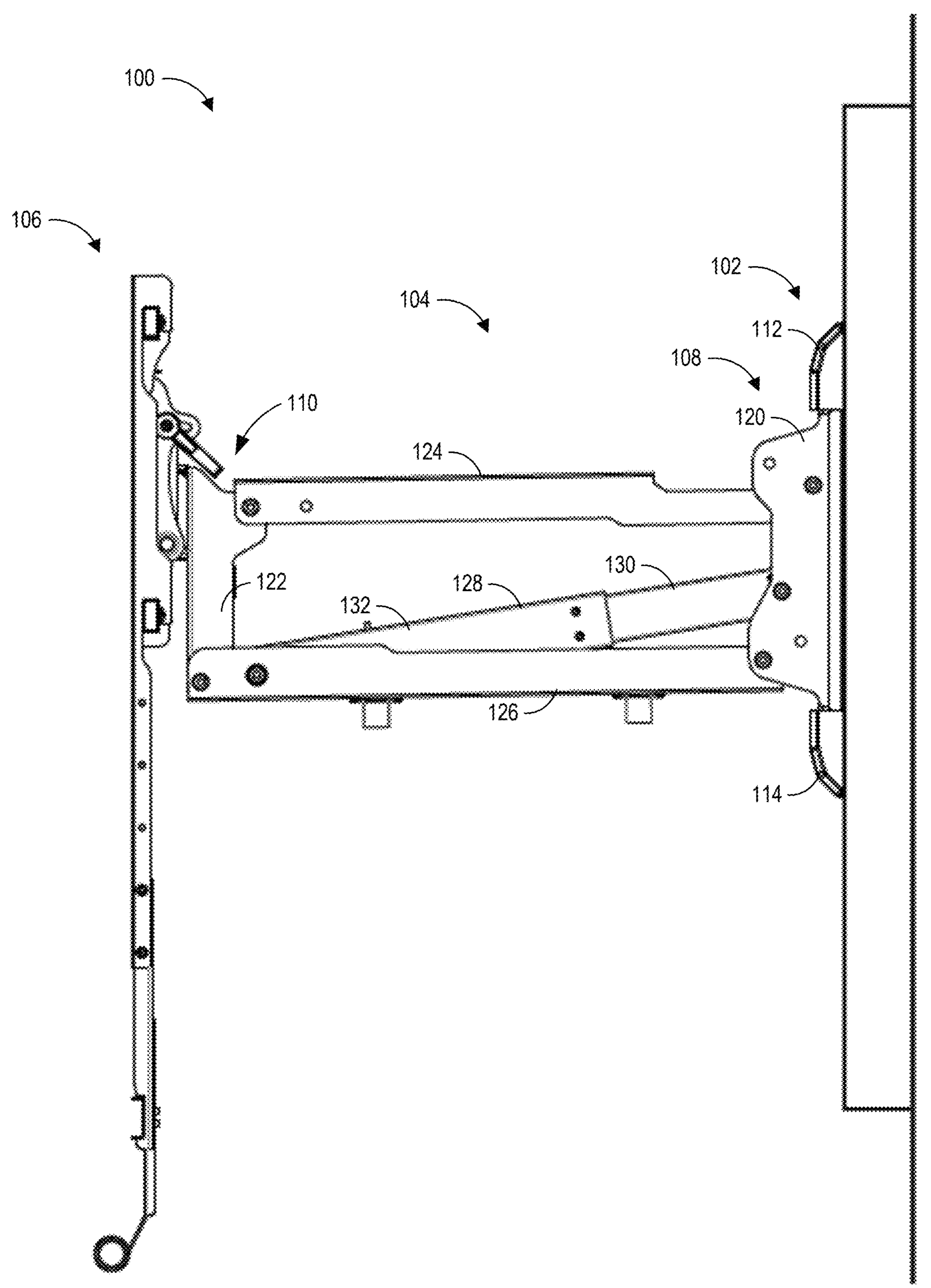
FIG. 2 is a side view of the display mount of FIG. 1, illustrating components of an embodiment of a height adjustment assembly therefor.
Figure 3:
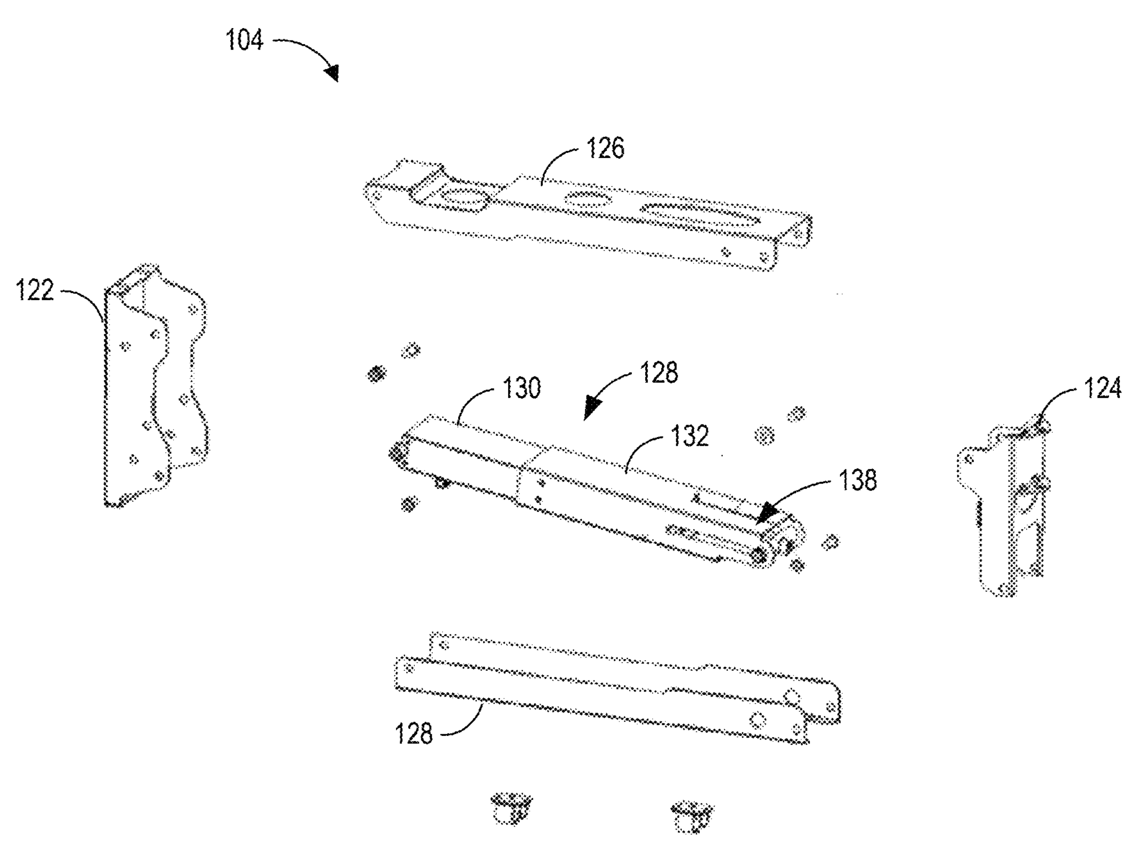
FIG. 3 is an exploded isometric view of components oh the height adjustment assembly, according to an embodiment.
Figure 4:
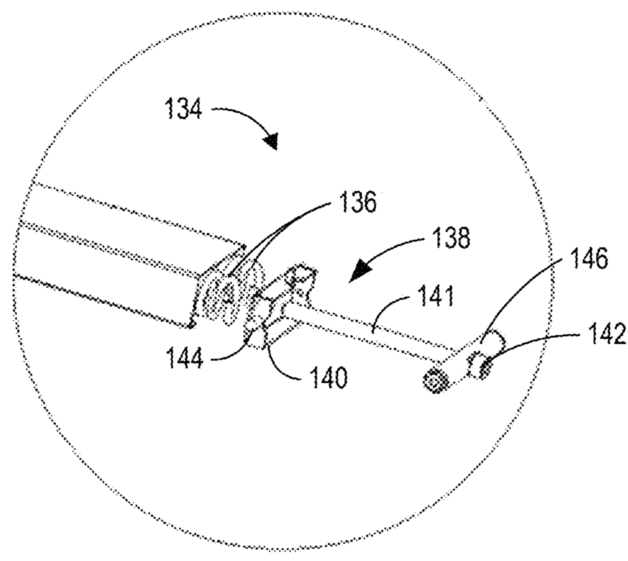
FIG. 4 illustrates some internal components of the height adjustment assembly.

With reference now to FIGS. 1-5B, an embodiment of the height adjustment assembly 104 will now be described in more detail. In the illustrated embodiment, the height adjustment assembly comprises a rear bracket 120, a front bracket 122, an upper fixed arm 124, a lower fixed arm 126, and an adjustable tension arm 128. The adjustable tension arm 128 comprises a first arm portion 130 and a second arm portion 132, which are arranged in a sliding or telescoping manner with respect to each other such that the overall length of the adjustable tension arm 128 can change based on the relative position of the first arm portion 130 and the second arm portion 132. The adjustable tension arm 128 is also provided with an adjustment mechanism 134, as best shown in FIG. 4. The adjustment mechanism can comprise, for example, one or more springs 136, and a tension adjuster 138. The tension adjuster 138 can be configured to allow for the spring force of the one or more springs 136 to be adjusted, as will be described in more detail below with reference to FIGS. 4-5B.

With reference now to FIGS. 2 and 3, the height adjustment assembly 104 includes the rear bracket 120, the front bracket 122, the upper fixed arm 124, the lower fixed arm 126, and the adjustable tension arm 128. The rear bracket 122 is configured to couple on top and bottom edges to the upper and lower cross members 112, 114 of the wall mount portion 102 of the display mount. In the illustrated embodiment, the rear bracket 122 comprises flanges to which (e.g., between which) the upper fixed arm 124, the lower fixed arm 126, and the first arm portion 130 of the adjustable tension arm 128 can be mounted on the first end 108. For example, each of these can be fixed with a pin or other fasteners that allows each of the upper fixed arm 124, the lower fixed arm 126, and the first arm portion 130 of the adjustable tension arm 128 to rotate about their connection to the rear bracket 120. On the second end 108, the front bracket 124 is provided. As will be described further below, the front bracket 124 is configured to couple to the display mount portion 106. As shown in FIG. 3, for example, the front bracket 124 comprises flanges to which (e.g., between which) the upper fixed arm 124, the lower fixed arm 126, and the first arm portion 130 of the adjustable tension arm 128 can be mounted on the second end 108. For example, each of these can be fixed with a pin or other fasteners that allows each of the upper fixed arm 124, the lower fixed arm 126, and the first arm portion 130 of the adjustable tension arm 128 to rotate about their connection to the front bracket 124.

Each of the rear bracket 122, the front bracket 124, the upper fixed arm 126, and the lower fixed arm 128 are of fixed length and dimension. These can be sized and configured to provide a four-bar mechanism structure that is configured to generally maintain the rear bracket 122 and the front bracket in a generally vertically configuration (e.g., exactly vertical, within 1 degree, within 2.5 degrees, within 5 degrees or within 10 degrees) as the height adjustment assembly 104 is rotated. In this manner, as the height adjustment assembly 104 is rotated relative to the wall mount portion 102, the height of the front bracket 124 is adjusted up and down and remains generally vertically oriented.

The height adjustment assembly 104 is further provided with the adjustable tension arm 128. The adjustable tension arm 128 is configured to provide a spring force that can support the height adjustment assembly 104 in any position. This allows a user to simply pull the height adjustment assembly 104 into a desired position and have that positioned maintained, without requiring any additional steps or tooling. As shown, for example, in FIG. 3, the adjustable tension arm 128 comprises the first arm portion 130 and the second arm portion 132. The first arm portion 130 and the second arm portion 132 can be slidingly engaged with each other, for example, in a telescoping manner, such that the overall length of the adjustable tension arm 128 can be adjusted by sliding or otherwise positioning the first arm portion 130 relative to the second arm portion 132. The first arm portion 130 can further be pivotally coupled to the rear bracket 122 on the first end 108, and the second arm portion 132 can further be pivotally coupled to the front bracket 124 on the second end 110. As the height adjustment assembly 104 rotates about the wall mount portion 102, the length of the adjustable tension arm 128 increases or decreases in length (for example, by sliding the first arm portion 130 relative to the second arm portion 132) to permit the motion. In some embodiments, the first arm portion 130 and the second arm portion 132 can be provided with pins engaged with slots, or other suitable structures, to maintain alignment between the two portions will permitting the relative motion.

The adjustable tension arm 128 is further provided with the adjustment mechanism 134, as best shown in FIG. 4. The adjustment mechanism 134 can comprise, for example, the one or more springs 136, and the tension adjuster 138. The tension adjuster 138 can be configured to allow for the spring force of the one or more springs 136 to be adjusted. The springs 136 can be provided on or within the adjustable tension arm 128, for example, on or within the first arm portion 130 and the second arm portion 132. On one end, the springs 136 are attached to one end of the adjustable tension arm 128. For example, in the illustrated embodiment, the springs 136 are attached to the first end of the first arm portion 130. On the second end 110, the springs 136 are attached to the tension adjuster 138. For example, as shown in FIG. 4, the springs can be attached to a carrier 140. The carrier 140 can be coupled to a shaft 141. The shaft can be provided with an adjustment head 142, which can be rotated to move the carrier 140 backwards or forwards along the shaft 141. Moving the carrier backwards or forwards along the shaft causes the springs 136 to be stretched or compressed to adjust the spring force of the spring. The spring force can be adjusted to counterbalance the weight of the adjustable tension arm 128, the display mount portion 106, and the display itself so that the position of the display can be adjusted in a free-floating manner. That is, a user can move the display to a desired position easily (e.g., by hand), release the display, and the display will remain at the desired height.

With further reference to FIGS. 3 and 4, the tension adjuster 138 can be slidingly coupled on one end to the second arm portion 132 and fixedly coupled on the other end to the end of the second arm portion 132. For example, as shown in the illustrated embodiment, the carrier 141 include pins 144 (FIG. 4) which ride in corresponding slots 146 on the second arm portion 132. The other end of the tension adjuster 138 is coupled to the end of the second arm portion 132 with pin 146.

Figures 5A, 5B:
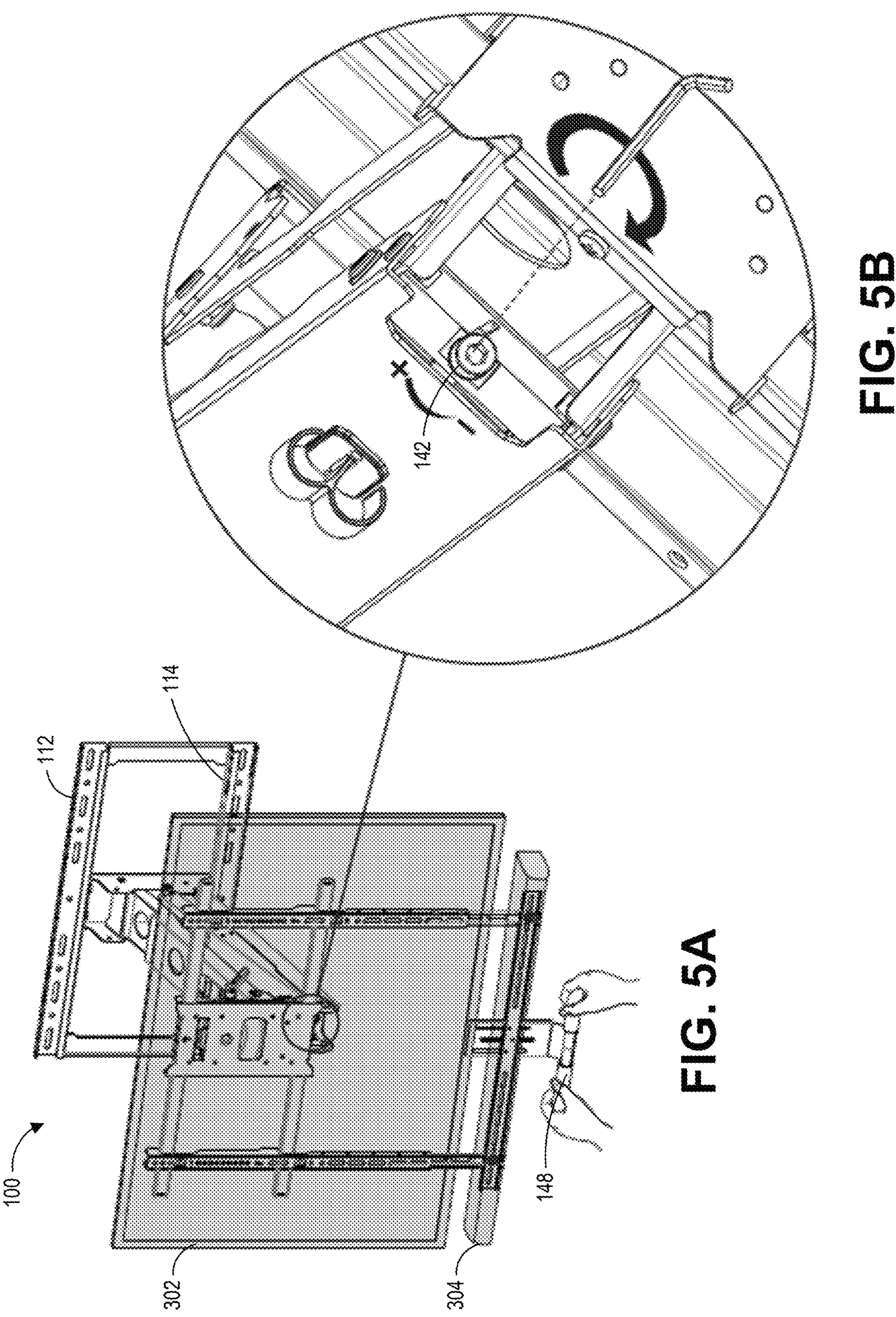
FIG. 5A illustrates an adjustment mechanism for adjusting a spring force for the height adjustment assembly.
FIG. 5B is a detailed view of the height adjustment assembly.

FIGS. 5A and 5B illustrate functionality of the height adjustment assembly 102. In FIG. 5A, the display mount 100 is shown with a display 302 and sound bar 304 positioned thereon. A user (hands illustrated) can grip the display mount 100 suing handle 146 and adjust the position of the display up and down by rotating the height adjustment assembly 104 relative to the wall mount portion 102. With the display 302 positioned as desired, the handle 148 can be released, and the display 300 will remain in that position because of the spring force of the height adjustment assembly 102. FIG. 5B illustrates that the adjustment head 142 of the tension adjuster can be rotated, in the illustrated embodiment, with a hex wrench, although other mechanisms are also possible to adjust the spring force. This need only be done initially to provide proper balancing. Once set properly, this should not need to be readjusted. For example, if upon releasing the handle 148, the display 302 slowly lowers, the spring force can be increased, and if upon releasing the handle 148, the display slowly rises, the spring force ben be decreased.

Turning now to FIGS. 6-10B, certain features of the display mount portion 106 of the display mount 100 will now be discussed. As shown in the embodiment illustrated in FIG. 6, the display mount portion 106 can comprise an adjustable hanging rod assembly 150 and a hanging hook assembly 152. The adjustable hanging rod assembly 150 can comprise can be configured to couple to the front bracket 124 of the height adjustment assembly 104 and provides rods, for example, upper and lower rods 154, 156. As will be described in more detail with reference to FIGS. 8-10B, the adjustable hanging rod assembly 150 is further configured to provide for various additional adjustment for the display 302, for example, left or right pivot, up and down tilt, and leveling rotation. The hanging hook assembly 152 can be configured to couple to a rear portion of the display 302 and provide hooks, for example, upper and lower hooks 158, 160, that can engage the upper and lower rods 154, 156 to support the display 302 on the display mount. The hanging hook assembly 152 can also comprise a sound bar mount 162 and the handle 148.

Figure 6:
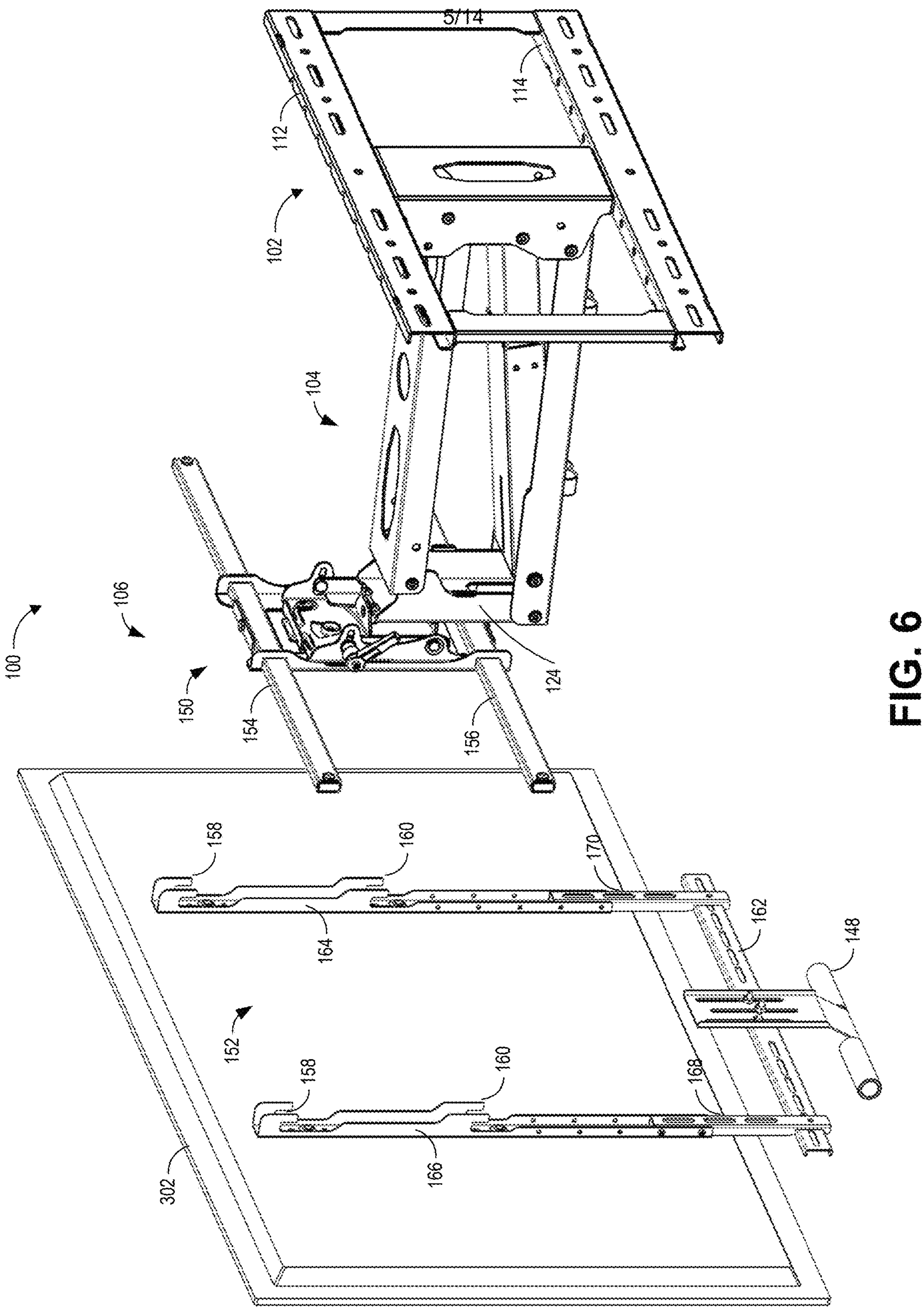
FIG. 6 is an isometric view of components of the display mount of FIG. 1 in a partially assembled configuration including a display.

With reference to FIG. 6, the hanging hook assembly 152 can comprise a right hook bracket 164 and a left hook bracket 166. Each of these can include an upper hook 158 and a lower hook 160. Each of the right hook bracket 164 and the left hook bracket 166 can couple to the rear portion of the display 302, for example, using conventional fasteners that are used for mounting displays (e.g., VESA-type fasteners). The right and left hook brackets 164, 166 can be provided with various holes or slots at common spacing in order to be usable with displays 302 of different size and configuration. Further, on lower ends, the right and left hook brackets 164, 166 can include right and left extension brackets 168, 170 that can be coupled to the right and left hook brackets 164, 166 at different adjustable positions to increase or decrease the overall length. On lower ends, the right and left extension brackets 168, 170 are cross-bracket or sound bar support bracket 162, that can be configured to support a sound bar, if desired. Accordingly, the right and left extension brackets 168, 170 can be positioned such that the sound bar is supported below the display 302. See, for example, the position of sound bar 304 relative to display 302 in FIG. 5A. If no sound bar is used, the extension brackets 168, 170 can be shortened (or eliminated) so that the cross-bracket 162 is positioned behind the display 302. The cross-bracket 162 can also be coupled to the handle 148. In the illustrated embodiment, the handle 148 is coupled to the cross-bracket 162 with fasteners engaged with slots such that the height of the handle 148 relative to the bottom of the display 302 (or the sound bar 304) can be adjusted to a desired position.

Figure 7:
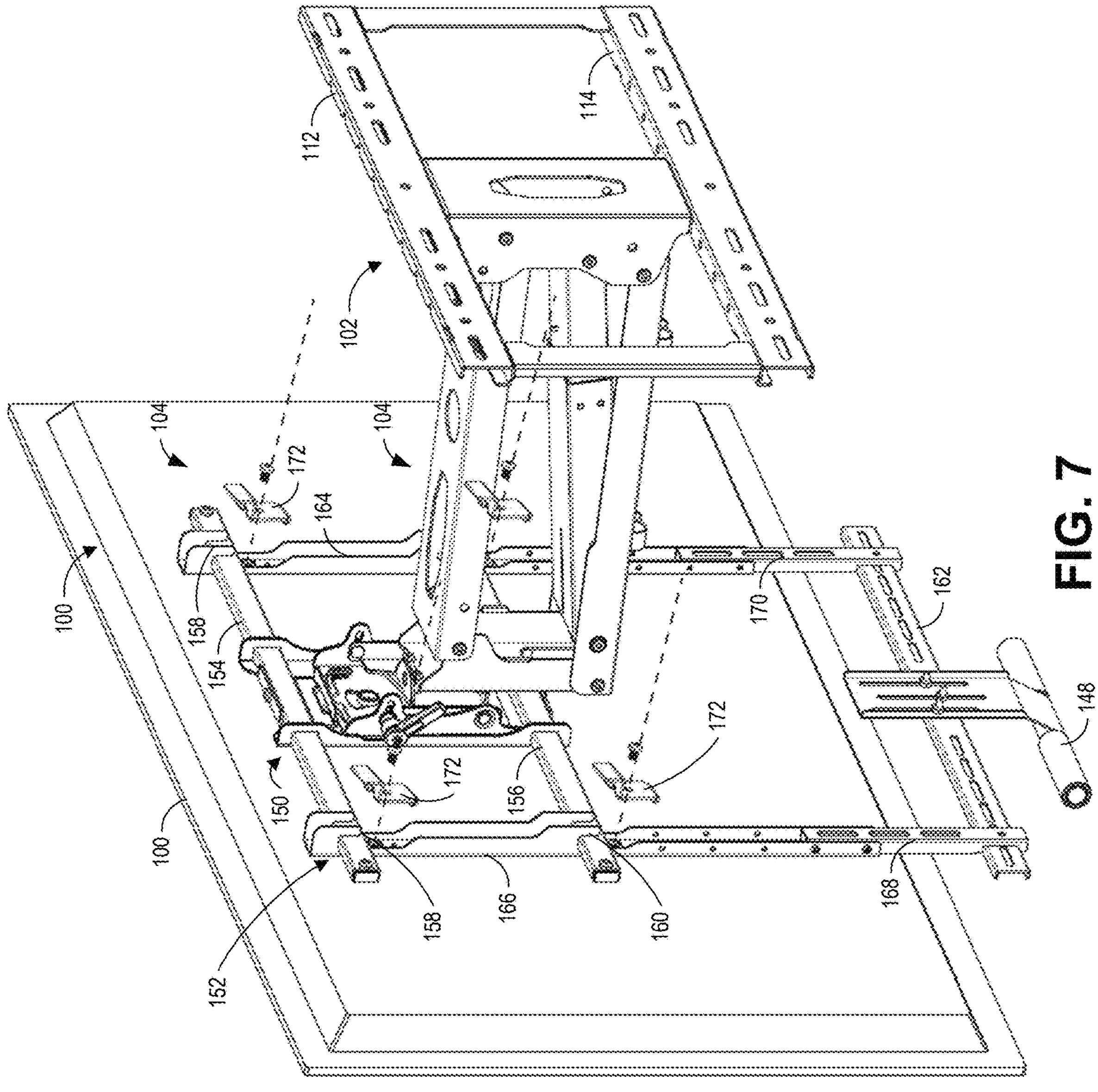
FIG. 7 is an isometric view illustrating locking tabs that can be provided to secure the display to the display mount, according to an embodiment.

Turning now to FIG. 7, example engagement between the hanging hook assembly 152 and the adjustable hanging rod assembly 150 is shown. In this example, the upper and lower hooks 158, 160 of the right and left hook brackets 164, 166 are hooked over the upper and lower rods 154, 156 to support the weight of the display 300. Locking brackets 172 can be used to enclose the upper and lower hooks 158, 160 around the upper and lower rods 154, 156. The locking brackets 172 can be secured to the right and left hook brackets 164, 166 with fasteners, such as bolts.

Figure 8:
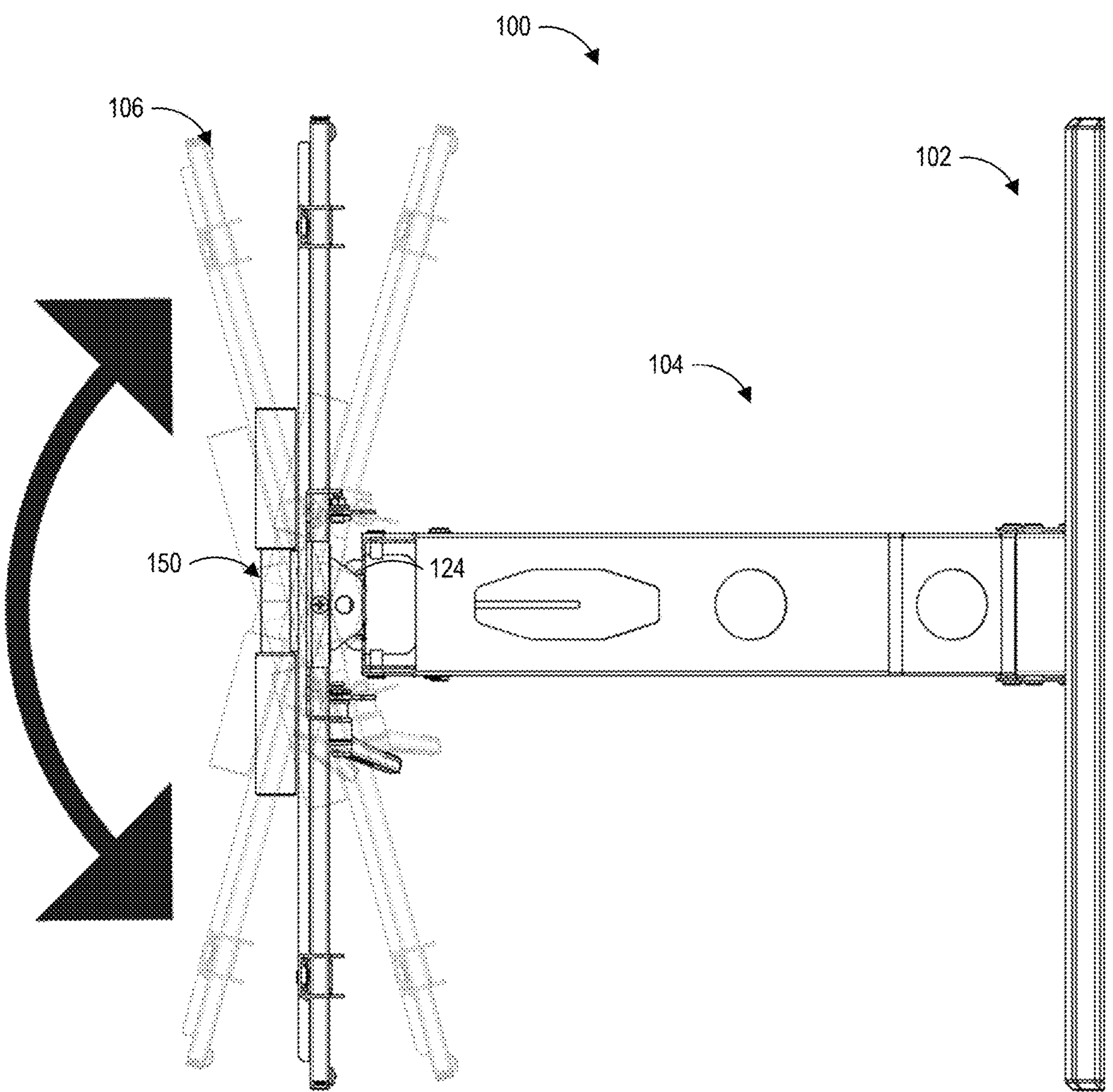
FIG. 8 is a top view of the display mount of FIG. 1 illustrating an example right and left pivot adjustment therefor according to an embodiment.

FIG. 8 is a top view of the display mount 100 illustrating an example right and left pivot adjustment therefor according to an embodiment. Right and left pivot can be accomplished at the joint that couples the front bracket 124 to the adjustable handing rod assembly 150. This joint can provide a pivot about a generally vertical axis in some embodiments, the joint provides for 30 degrees of pivoting in each direction, although other configurations are also possible.

Figures 9A, 9B:
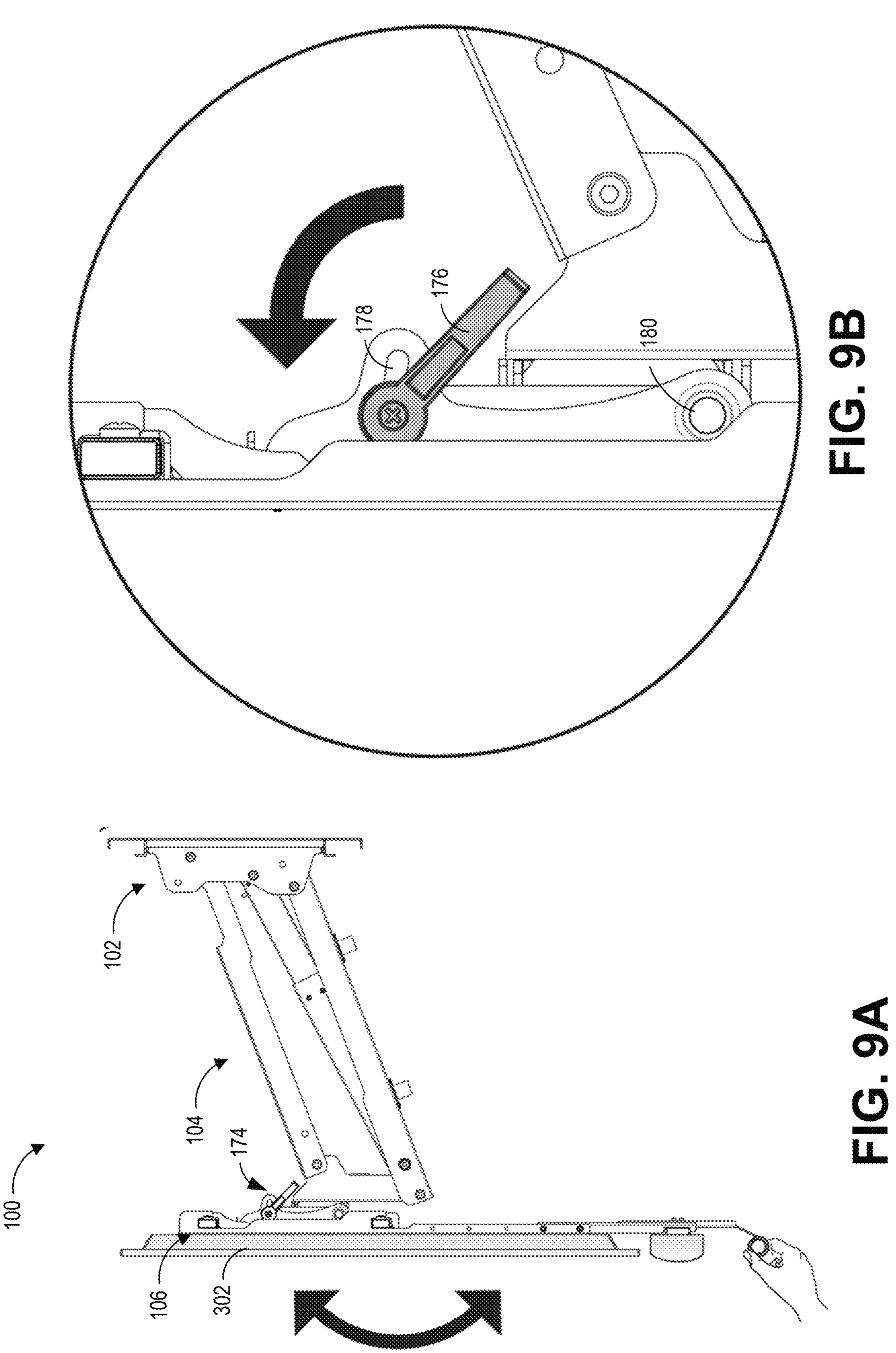
FIG. 9A is a side view of the display mount of FIG. 1 illustrating an example tilt adjustment therefore.
FIG. 9B is a detailed side view further illustrating the tilt adjustment.

FIG. 9A is a side view of the display mount 100 illustrating an example tilt adjustment mechanism 174. FIG. 9B is a detailed side view further illustrating the tilt adjustment mechanism 174. As shown in FIG. 9A, a user may tilt the display 300 about a generally horizontal axis to provide at least 5 to 10 degrees of adjustment about the axis. In the detailed view of FIG. 9B, the tilt adjustment mechanism 174 is shown as a locking lever 176 engaged with a slot 178. When the locking lever 178 it loosened, it can move through the slot and be tightened in a new position. Movement through the slots allows rotation about the axis shown at 180 to provide for tilt adjustment.

Figures 10A, 10B:
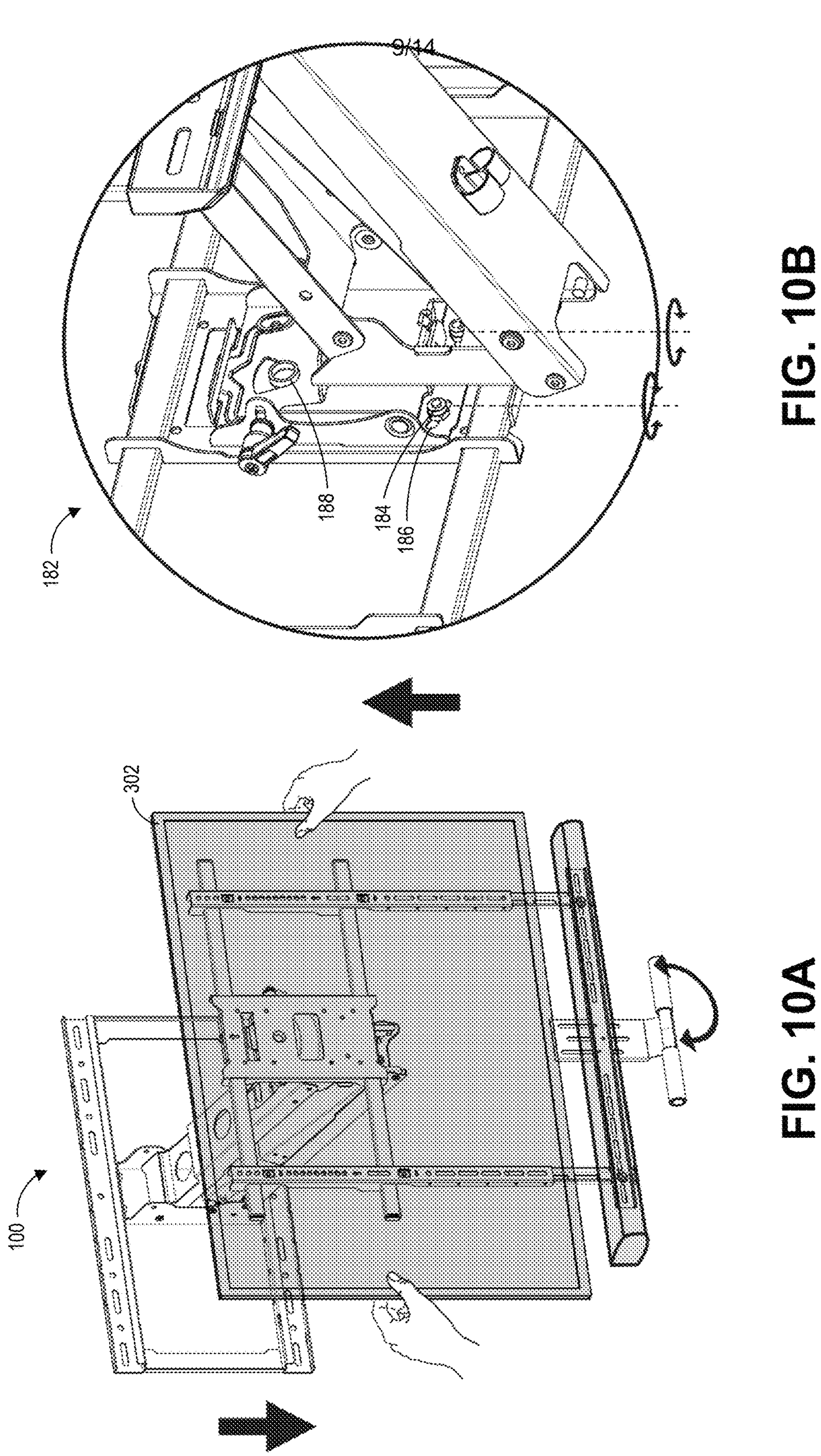
FIG. 10A is a perspective view of the display mount of FIG. 1 illustrating an example pivot or leveling adjustment therefore.
FIG. 10B is a detailed perspective view further illustrating the pivot or leveling adjustment.

FIG. 10A is a perspective view of the display mount 100 illustrating an example pivot or leveling adjustment therefore. FIG. 10B is a detailed perspective view further illustrating the pivot or leveling adjustment. As shown in FIG. 10A, a user can pivot or rotate the display 302 within the plane of the display 302 to, for example, level the display 302. In some embodiments, up to 5 or 10 degrees of rotation is provided. The leveling adjustment device 182 is shown in more detail in FIG. 10B. As shown, fasteners 184 can be engaged with slots 186 to allow rotation about pivot 188. The fasteners 184 can be loosened to permit rotation and tightened to limit rotation.

Figure 11:
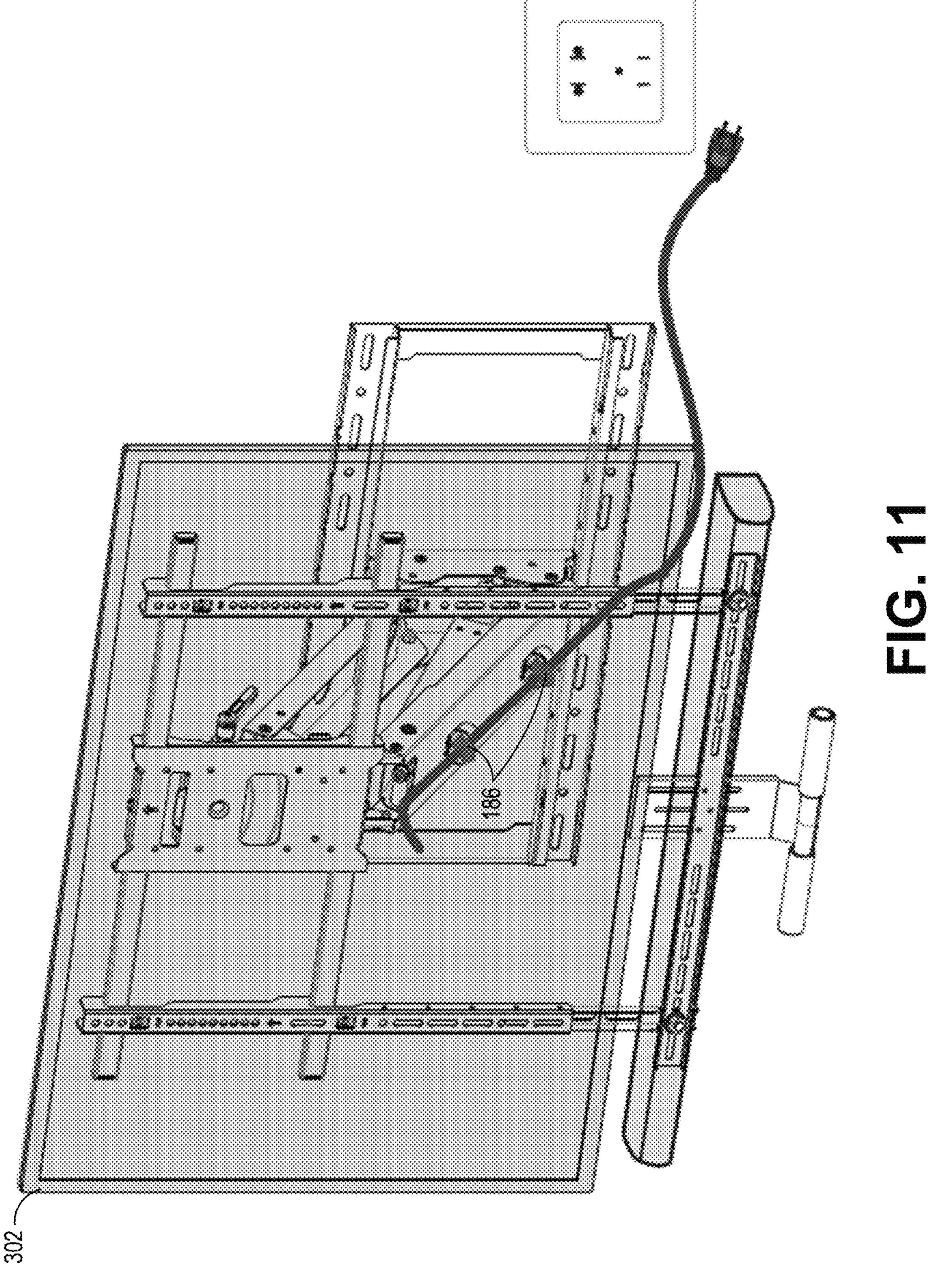
FIG. 11 is a perspective view illustrating cable management features of the display mount of FIG. 1 according to an embodiment.

FIG. 11 is a perspective view illustrating cable management features of the display mount 100 according to an embodiment. In the illustrated embodiment, cable clips 186 are shown installed on an underside of the lower fixed arm 126 to route and hide cables from the display 302.

Figures 12A, 12B:
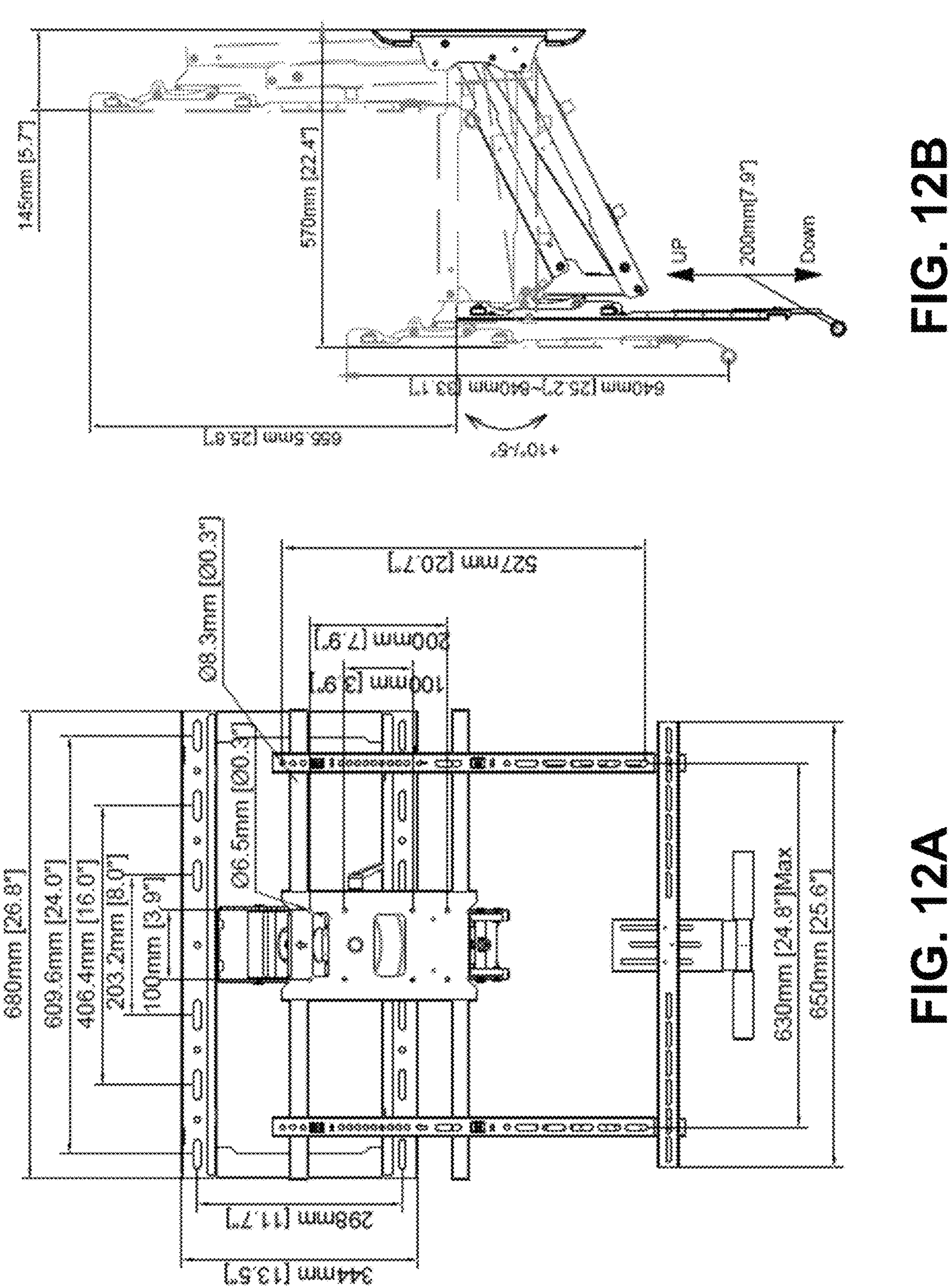
FIGS. 12A and 12B are front and side views, respectively, of the display mount of FIG. 1 illustrating certain example dimensions according to an embodiment.

FIGS. 12A and 12B are front and side views, respectively, of the display mount 100 illustrating certain example dimensions according to an embodiment. The display mount 100 can be provided in other sizes and with other dimensions as well. In some embodiments, the display mount 100 is configured for use with displays from 42 inches to 65 inches and/or from 17.6 points to 55 pounds. The displays can use 100 mm×100 mm VESA patterns or 600 mm by 500 mm VESA patterns or others.

Figure 13:
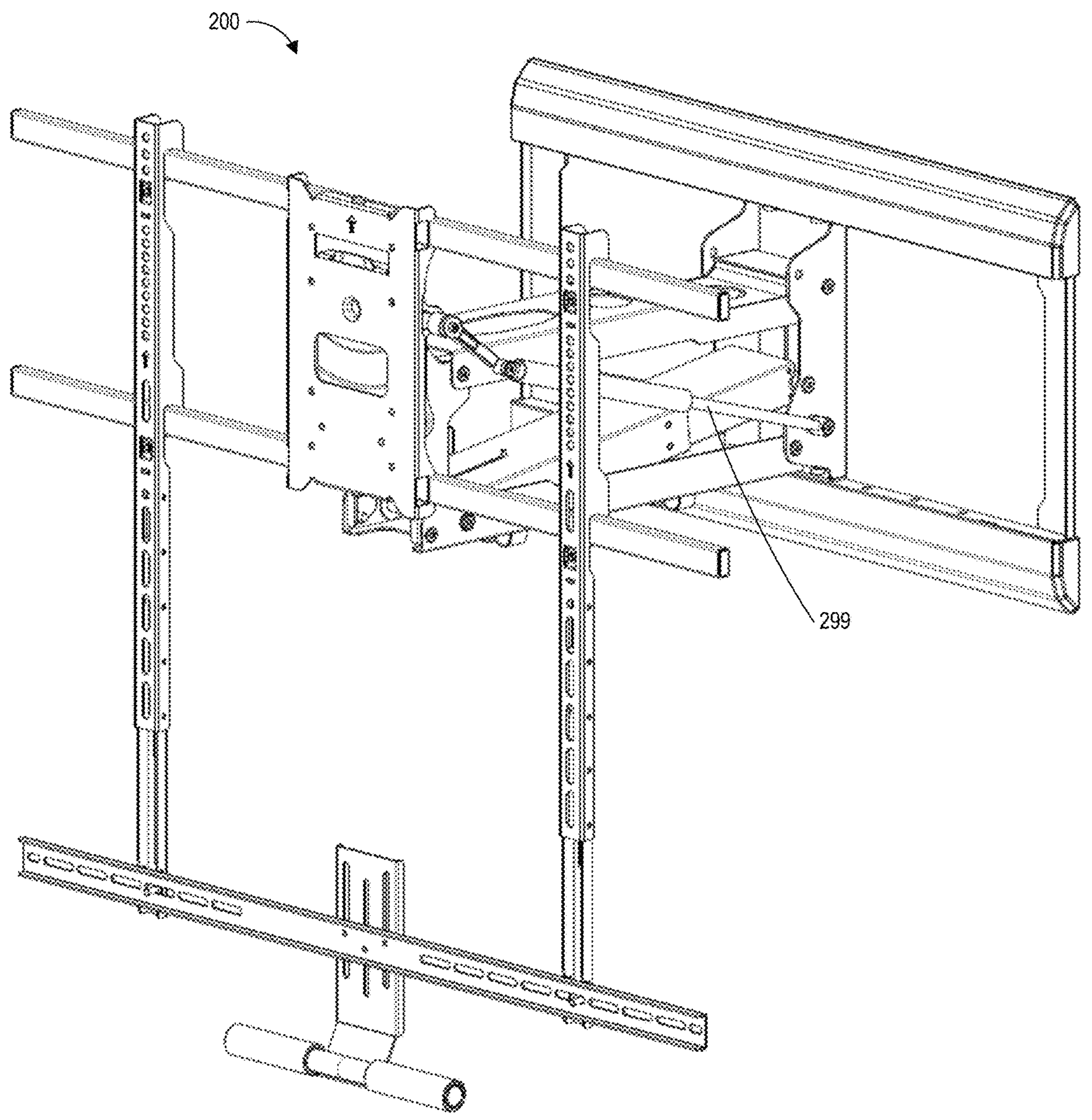
FIG. 13 is a perspective view of an embodiment of another display mount for mounting a display.
Figure 14:
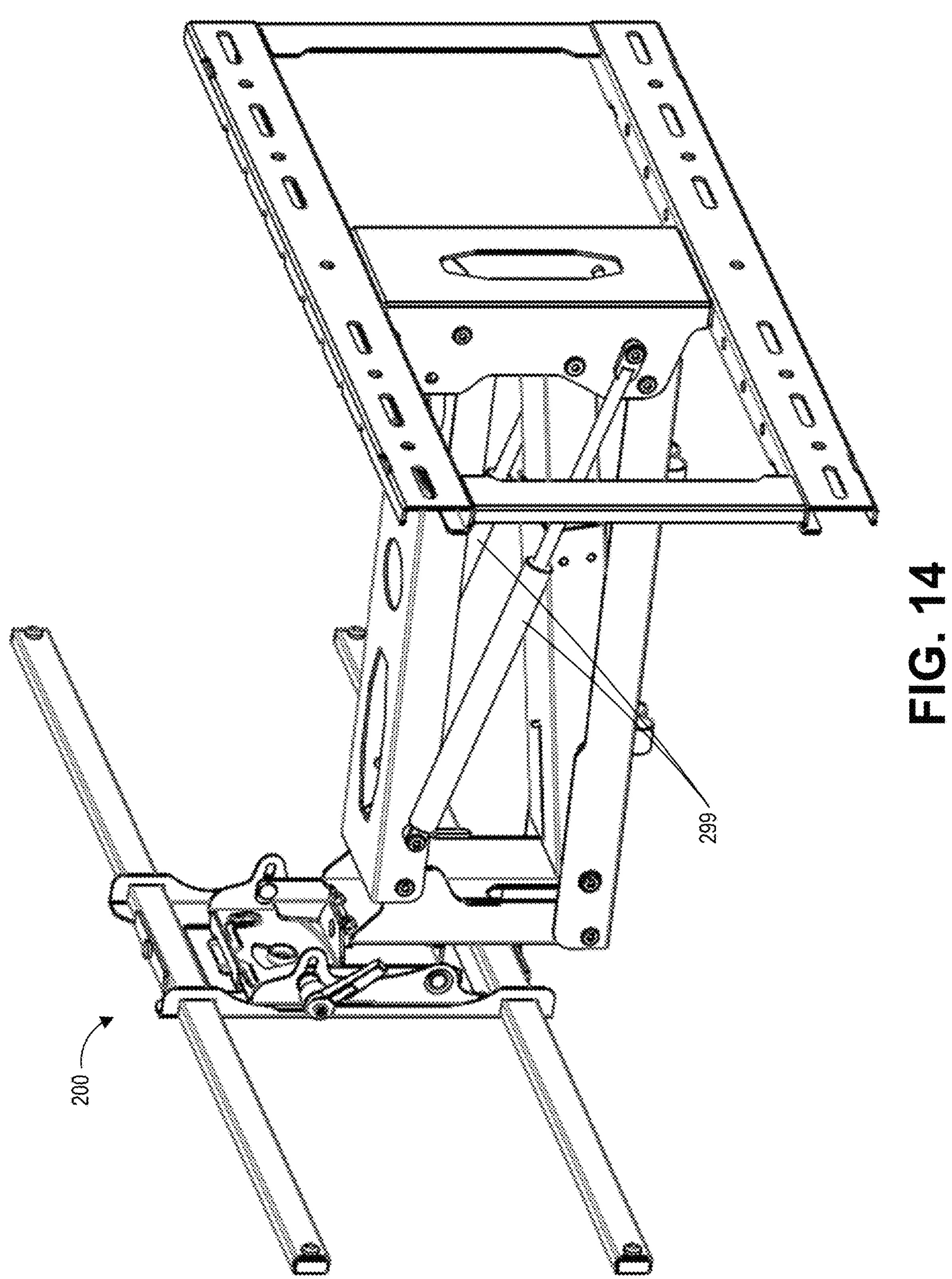
FIG. 14 is another isometric view of the display mount of FIG. 13.

FIG. 13 is a perspective view of an embodiment of another display mount 200 for mounting a display. FIG. 14 is another isometric view of the display mount 200. The display mount 200 is similar in many respects to the display mount 100 described previously. However, to support larger or heavier displays, the display mount 200 further includes two gas struts 299 on the height adjustment assembly to further support eh weight. As shown in FIG. 14, the gas struts 299 each extend from the rear bracket to a distal end of the upper fixed arm.

Figures 15A, 15B:
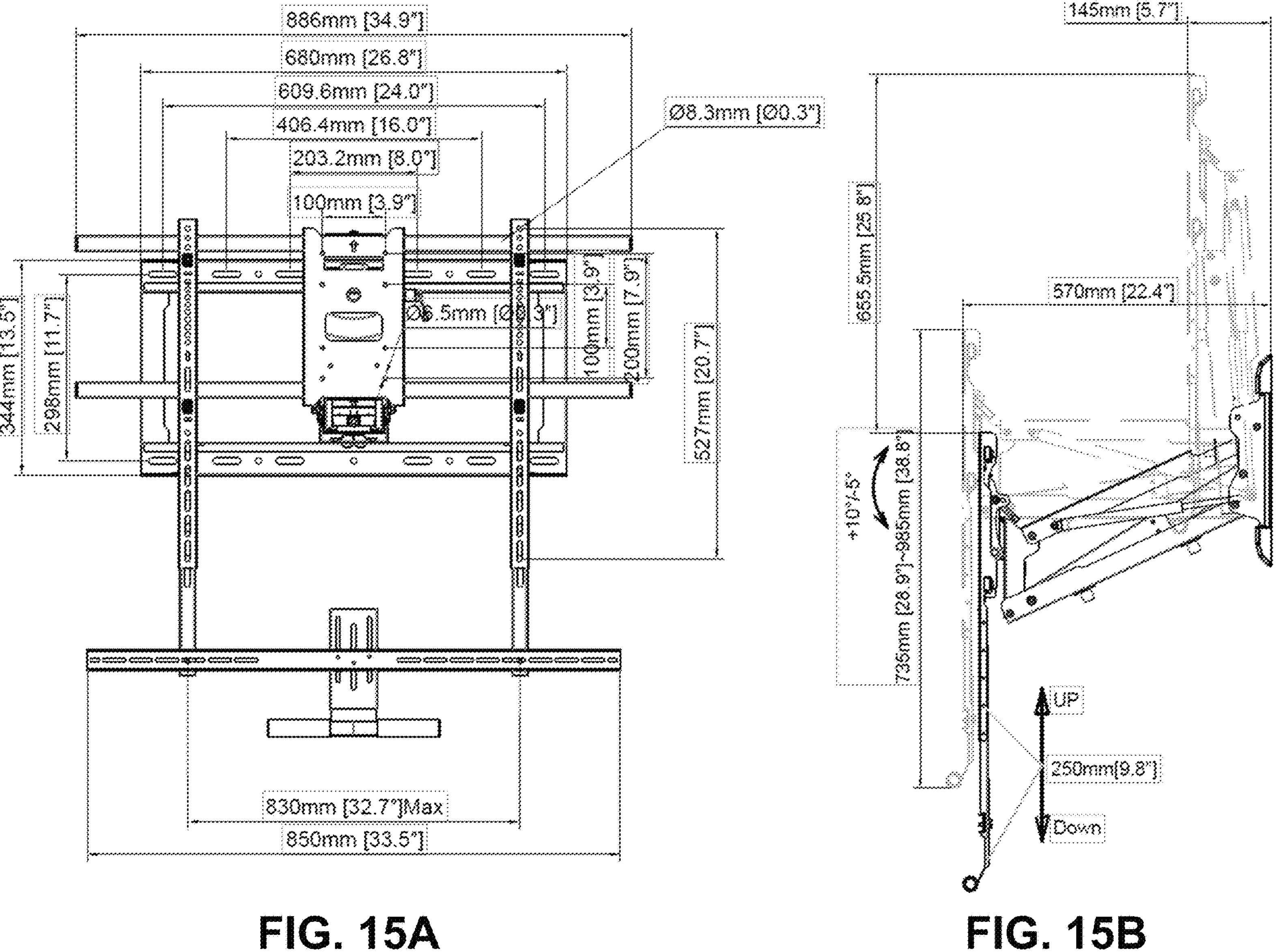
FIGS. 15A and 15B are front and side views, respectively, of the display mount of FIG. 13 illustrating certain example dimensions according to an embodiment.

FIGS. 15A and 15B are front and side views, respectively, of the display mount of FIG. 13 illustrating certain example dimensions according to an embodiment. The display mount 200 can be provided in other sizes and with other dimensions as well. In some embodiments, the display mount 200 is configured for use with displays from 55 inches to 86 inches and/or from 61 pounds to 55 110. The displays can use 100 mm×100 mm VESA patterns, 600 mm by 500 mm VESA patterns, 800 mm×500 mm VESA patterns or others.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged or excluded from other embodiments.

The above description discloses several methods and materials of the present inventions. The inventions are susceptible to modifications in the methods and materials, as well as alterations in the fabrication methods and equipment. Such modifications will become apparent to those skilled in the art from a consideration of this disclosure or practice of the inventions disclosed herein. Consequently, it is not intended that the inventions be limited to the specific embodiments disclosed herein, but that it cover all modifications and alternatives coming within the true scope and spirit of the inventions as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A display mount for mounting a display over a mantle, fireplace, or similar structure, the display mount comprising:

a wall mounting portion configured to be secured to a wall;

a height adjustment assembly pivotally coupled to the wall mounting portion, the height adjustment assembly comprising:

a rear bracket coupled to the wall mounting portion, a front bracket, an upper fixed arm pivotally coupled on a first end to the rear bracket and pivotally coupled on a second end to the front bracket, a lower fixed arm pivotally coupled on a first end to the rear bracket and pivotally coupled on a second end to the front bracket, and an adjustable tension arm pivotally coupled on a first end to the rear bracket and pivotally coupled on a second end to the front bracket, the adjustable tension arm comprising an adjustable length and providing an adjustable tension force;

a display mounting portion coupled to the front bracket and further configured to couple to a rear of a display; and a tilt adjustment member coupled to the display mounting portion, the tilt adjustment member comprising a locking lever and a slot positioned behind the display mounting portion, wherein the locking lever is selectively engageable with the slot to allow a user to reposition the locking lever relative to the slot by manually loosening the locking lever behind the display mounting portion, slidably moving the locking lever relative to the slot to a new position along the slot, and manually tightening the locking lever at the new position thereby setting a tilt angle of the display mounting portion about a generally horizontal axis.

2. The display mount of claim 1, wherein the adjustable tension arm comprises:

a first arm portion; and a second arm portion, the second arm portion slidingly engaged with the first arm portion such that the adjustable length of the adjustable tension arm is adjusted by varying a position of the second arm portion relative to the first arm portion.

3. The display mount of claim 2, wherein the second arm portion is telescopingly engaged with the first arm portion.

4. The display mount of claim 3, wherein the adjustable tension arm further comprises:

one or more springs positioned on or within the adjustable tension arm, the one or more springs providing the adjustable tension force; and an adjustment mechanism for adjusting the adjustable tension force by varying the length of the one or more springs.

5. The display mount of claim 4, wherein the one or more springs are provided within an interior space formed in the first arm portion and the second arm portion.

6. The display mount of claim 5, wherein the one or more springs are attached on a first end to an end of the adjustable tension arm, and wherein the one or more springs are attached on a second end to the adjustment mechanism.

7. The display mount of claim 6, wherein the adjustment mechanism comprises:

a carriage, and wherein the one or more springs are attached on the second end to the carriage;

a shaft, wherein the carriage is mounted on the shaft; and an adjustment head, wherein rotation of the adjustment head causes the carriage to travel along the shaft to adjust the adjustable tension force.

8. The display mount of claim 7, wherein the carriage further comprises pins engaged with slots formed on the second arm portion.

9. The display mount of claim 8, wherein the one or more springs comprise two springs positioned in parallel.

10. The display mount of claim 1, wherein the display mounting portion comprises:

an adjustable hanging rod assembly coupled to the front bracket; the adjustable hanging rod assembly comprising an upper rod and a lower rod; and a hanging hook assembly comprising at least a pair of upper hooks and a pair of lower hooks configured to engage with the upper rod and the lower rod, the hanging hook assembly configured to couple to the rear portion of the display.

11. The display mount of claim 10, wherein the hanging hook assembly further comprises:

a right hook bracket configured to couple to the rear portion of the display, the right hook bracket comprising a first upper hook of the pair of upper hooks and a first lower hook of the pair lower hooks; and a left hook bracket configured to couple to the rear portion of the display, the left hook bracket comprising a second upper hook of the pair of upper hooks and a second lower hook of the pair lower hooks.

12. The display mount of claim 11, further comprising a plurality of locking brackets configured to secure the upper and lower hooks around the upper and lower rods.

13. The display mount of claim 12, wherein each of the plurality of locking brackets is configured to be secured to one of the right hook bracket or the left hook bracket with a fastener.

14. The display mount of claim 13, wherein the hanging hook assembly further comprises:

a right extension bracket configured to couple to the right hanging hook bracket at a variety of positions;

a left extension bracket configured to couple to the left hanging hook bracket at a variety of positions; and a cross-bracket extending between and coupling the right and left extension brackets.

15. The display mount of claim 14, wherein the position of the cross-bracket relative to the display can be adjusted by adjusting the positions of the right and left extension brackets.

16. The display mount of claim 15, wherein the cross-bracket comprises a soundbar support bracket.

17. The display mount of claim 16, further comprising a handle coupled to the cross-bracket, wherein a height of the handle relative to the cross-bracket is adjustable.

18. The display mount of claim 10, wherein the hanging rod assembly is configured to couple to the front bracket to provide 30 degrees of pivot about a vertical axis in each direction.

* * * * *